United States Patent Office
3,743,608
Patented July 3, 1973

3,743,608
ANTISTATIC COMPOSITION
Teiji Habu, Kyusaku Yoshida, Yotaro Hirao, and Kazuo Takahashi, Tokyo, Japan, assignors to Konishiroku Photo Industry Co., Ltd., Tokyo, Japan
No Drawing. Filed Aug. 2, 1971, Ser. No. 168,355
Claims priority, application Japan, Aug. 5, 1970, 45/67,990
Int. Cl. G03c 1/82; H01b 1/06
U.S. Cl. 252—500                    5 Claims

ABSTRACT OF THE DISCLOSURE

An antistatic composition which comprises a protectice colloid solution and, dispersed therein, a solution of an antistatic agent in a substantially water-insoluble organic solvent of the phthalate, pyrrolidone or phosphate type and having a specific gravity lower than that of the protective colloid.

---

This invention relates to a novel antistatic composition capable of imparting excellent antistatic characteristics to any shaped articles particularly including photographic materials.

The charging phenomenon of insulators has not theoretically been elucidated yet, but is chiefly deemed as a surface phenomenon, in general. It is considered that when insulators are contacted or frictioned with each other, or peeled off from each other, the mechanical energy applied thereto is converted to electric energy, whereby static electricity is generated to charge the insulators. Accordingly, the greater the amount of mechanical energy applied, the larger the amount of static electricity generated. However, the charging phenomenon varies depending on the combination of insulators which are contacted or frictioned with each other, and thus is an extremely complex phenomenon.

The above-mentioned charging phenomenon of insulators frequently brings about serious drawbacks in the fields where insulators are utilized, and it is well known that the said phenomenon has a fatal effect on such high sensitivity materials as, for example, light-sensitive photographic materials. That is, the generation of static electricity in a light-sensitive photographic material tends to cause the formation of so-called static marks due to the discharge of said electricity, and since the static marks cannot be observed unless the photographic material is developed, the charging phenomenon is an extremely troublesome phenomenon.

Processes for preventing insulators from the charging phenomenon may be roughly divided into two; one is a process in which the amount of static electricity generated is decreased, and the other is a process in which the static electricity generated is discharged quickly. According to the former process, the so-called triboelectric series, i.e. the phenomenon that the charging phenomenon varies depending on the combination of insulators to be contacted or frictioned with each other, is utilized, or the contact areas of the insulators are made small, while according to the latter process, conductivity is imparted to the insulators by adoption of a certain procedure. In most cases, however, the two processes are employed in combination in order to attain sufficient antistatic effect.

Most of the antistatic agents which have been developed hitherto are those of the type which are used in the latter process, in which an ion-conductive antistatic agent, for example, is coated or adsorbed on the surface of an insulator, or is incorporated into the insulator, to decrease the specific resistance of the insulator surface, thereby imparting conductivity to the insulator. Antistatic agents of this type are composed mainly of certain kinds of surface active agents. When an insulator, which has been treated with an antistatic agent of this kind by such means as coating, adsorption or incorporation, is washed with water or frictioned, the insulator is deteriorated in antistatic effect, and the deterioration in anistatic effect becomes marked with lapse of time or due to the state of surroundings such as, for example, temperature, humidity and the like. Further, when this kind of antistatic agent is applied to a light-sensitive photographic emulsion, the antistatic agent interacts with a surface active agent or any other photographic additive contained therein to cause adverse influences on the coatability of said emulsion or on the photographic properties of the light-sensitive material obtained therefrom.

The present invention provides a novel antistatic composition capable of overcoming such drawbacks of conventional antistatic processes as mentioned above.

The antistatic composition according to the present invention is prepared by dispersing in a protective colloid solution a solution of an antistatic agent in a substantially water-insoluble organic solvent, which is lower in specific gravity than the protective colloid solution. When the antistatic composition of the present invention is applied to an insulator as by coating the composition on the insulator or immersing the insulator in the composition, it is possible to impart to the insulator an excellent antistatic effect which is free from the aforesaid drawbacks encountered in the conventional processes. The present composition is particularly effective for application to a high sensitivity material such as a light-sensitive photographic material. For example, when the antistatic composition of the present invention is applied as the uppermost surface layer of a light-sensitive photographic material by coating or the like means, the photographic material is not only completely protected from the charging phenomenon due to contact or friction with various members (e.g. parts inside a camera or other light-sensitive photographic materials), but also freed from deterioration in antistatic effect due to development treatment and the like or from undesirable interactions with any other compound, for example a surface active agent, contained in the photographic material. Accordingly, when the present composition is incorporated into an optional layer constituting a light-sensitive photographic material, it is possible to prevent the charging phenomenon brought about during the preparation of a photographic material. Further, it has also become possible to use excellent antistatic agents which have not been applicable to light-sensitive photographic materials because of their giving certain adverse influence to the photographic materials.

The antistatic agent used in the present invention may be any of the known antistatic agents, and includes, for example, those of the General Formulas I to VIII shown below.

General Formula I:

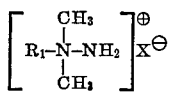

wherein $R_1$ is an alkyl group having 8 or more carbon atoms and X is a halogen atom.

Typical antistatic agents of this type are as follows:

(I-1)  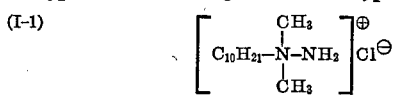

(I-2)  

(I-3) 

General Formula II:

$$[(R_2)_3\equiv N^{\oplus}-(CH_2)_n-N^{\oplus}\equiv(R_2)_3]2X^{\ominus}$$

wherein $R_2$ is a lower alkyl group, X is a halogen atom, and n is an integer.

Typical antistatic agents of this type are as follows:

(II-1) $[(CH_3)_3\equiv N^{\oplus}-(CH_2)_{10}-N^{\oplus}\equiv(CH_3)_3]2Br^{\ominus}$
(II-2) $[(CH_3)_3\equiv N^{\oplus}-(CH_2)_{18}-N^{\oplus}\equiv(CH_3)_3]2Cl^{\ominus}$
(II-3) $[(C_2H_5)_3\equiv N^{\oplus}-(CH_2)_{20}-N^{\oplus}\equiv(C_2H_5)_3]2Cl^{\ominus}$ General Formula III:

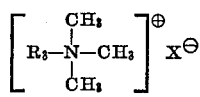

wherein $R_3$ is an alkyl group and X is a halogen atom.

Typical antistatic agents of this type are as follows:

(III-1) 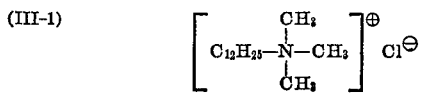

(III-2) 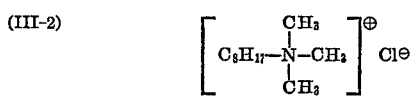

(III-3) 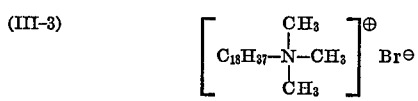

General Formula IV:

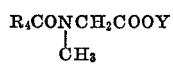

wherein $R_4$ is an alkyl group having not less than 8 carbon atoms and Y is a cation.

Typical antistatic agents of this type are as follows:

(IV-1) 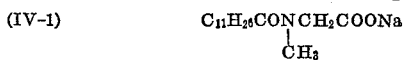

(IV-2) 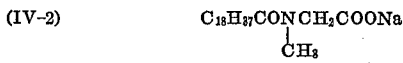

(IV-3) 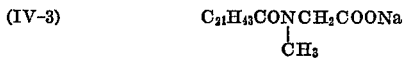

General Formula V:

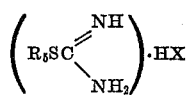

wherein $R_5$ is an alkyl group having not less than 8 carbon atoms and X is a halogen atom.

Typical antistatic agents of this type are as follows:

(V-1) 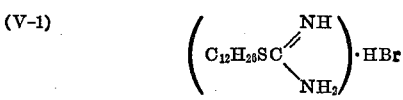

(V-2) 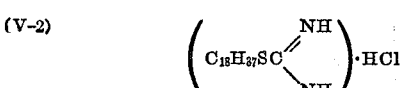

(V-3) 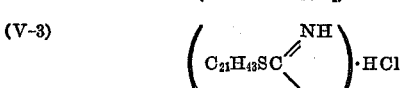

General Formula VI:

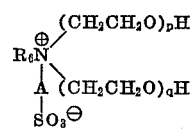

wherein $R_6$ is an alkyl group having not less than 8 carbon atoms; A is —CH(OH)—CH$_2$— or $$CH_2-CH(OH)-CH_2-$$

and $p+q$ is 2 or more.

Typical antistatic agents of this type are as follows:

(VI-1) 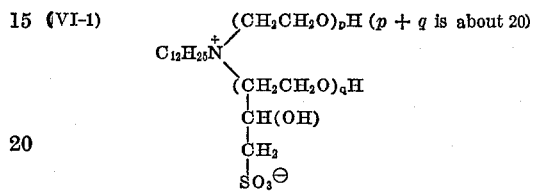

(VI-2) 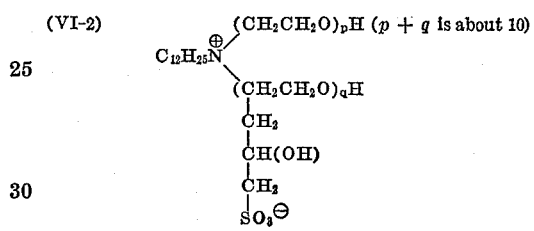

(VI-3) 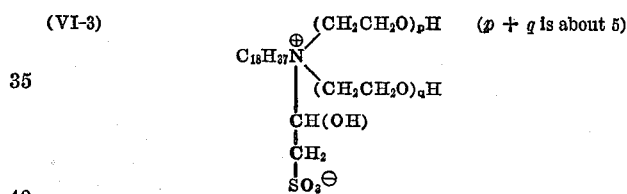

General Formula VII:

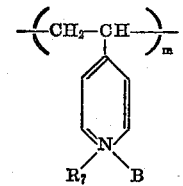

wherein $R_7$ is an alkyl, aralkyl or aryl group; B is —OSO$_2$CH$_2$CH$_3$ or a halogen atom; and m is 500 or more.

Typical antistatic agents of this type are as follows:

(VII-1) 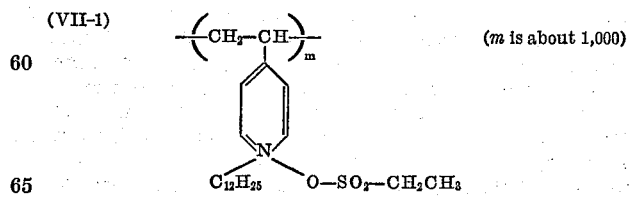 (m is about 1,000)

(VII-2) 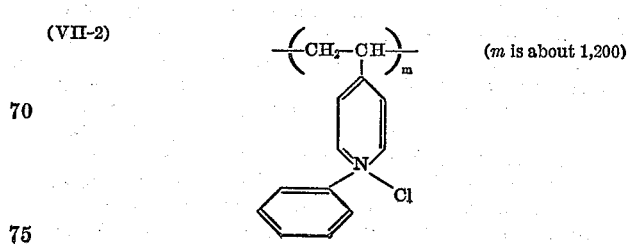 (m is about 1,200)

(VII-3) 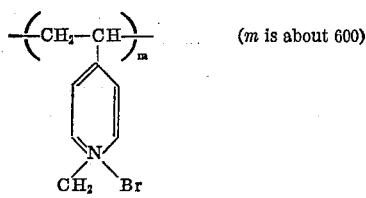 (m is about 600)

General Formula VIII:

$$(R_8 \equiv P-CHR_8) \oplus X \ominus$$

wherein $R_8$ is an aryl group; and X is a halogen atom.

Typical antistatic agents of this type are as follows:

(VIII-1) 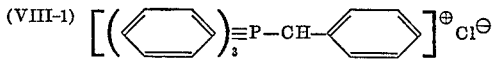

(VIII-2) 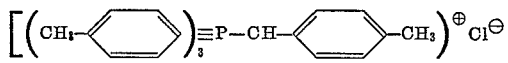

The substantially water-insoluble organic solvent, which is used to dissolve the above-mentioned antistatic agents, is required to be lower in specific gravity than the protective colloid, which is left when the protective colloid solution is dried. It is considered that the organic solvent takes part in the surfacial agglomeration of the antistatic agents to make them effectively display their antistatic effects. As such solvent, there is used an organic solvent of the phthalate, pyrrolidone or phosphate type, and typical examples thereof are dimethyl phthalate, dibutyl phthalate, oleyl pyrrolidone, lauryl pyrrolidone, triphenyl phosphate, tricresyl phosphate and tributylphenyl phosphate.

The protective colloid used in the present invention may be any of the known protective colloids, and typical examples thereof are gelatin, casein, agar and polyvinyl alcohol. These protective colloids may be used either singly or in the form of a mixture, or in admixture with synthetic resins. The protective colloids are used in the form of a solution in a suitable solvent such as water or the like.

The antistatic composition of the present invention is fundamentally prepared by dissolving the aforesaid antistatic agent in the aforesaid organic solvent, which is lower in specific gravity than the protective colloid to be employed, and then dispersing the resulting solution in the protective colloid solution by use of a suitable disperser. In this case, the amount of the antistatic agent is preferably 0.1 to 5 parts per 10 parts of said organic solvent, and the concentration of the protective colloid solution is preferably 0.5 to 15%. The ratio of the organic solvent solution of the antistatic agent to the protective colloid solution varies depending on whether the resulting antistatic composition is applied as is or after dilution, and is ordinarily in the range from 1:1 to 1:30. The thus obtained antistatic composition is successfully applied onto the surface of an insulator in a proportion of 0.5 to 50 cc. per m.² In case the antistatic agent is desired to be incorporated into a layer of a light-sensitive photographic material, it is used in such an amount that the above-mentioned proportion can be attained after coating. Examples of the light-sensitive material used in the above case are light-sensitive silver halide color photographic materials, light-sensitive silver halide black-and-white photographic material, light-sensitive materials for radioactive rays, etc. The antistatic composition of the present invention does not injure the photographic properties of these light-sensitive materials.

In order to disperse stably and uniformly the organic solvent solution of the antistatic agent into the protective colloid solution, there may be used a surface active agent. As the surface active agent, any anionic, nonionic, amphoteric and cationic surface active agent can be successfully used. In this case, 2 or more parts of a 5% solution of the surface active agent is used per 10 parts of the antistatic agent-containing solution, whereby the antistatic agent solution can be stably dispersed in the protective colloid solution.

In case gelatin is used as the protective colloid, and in case a solution of the antistatic agent in the aforesaid organic solvent is uniformly dispersed, together with a solution of the surface active agent, in an aqueous solution of the gelatin by use of such a dispenser as an ultrasonic disperser, and then the resulting compostion is cooled and stably stored in a gelled state, there is attained such a marked convenience that the composition can be redissolved in a required amount so as to be used any time as occasion demands.

Generally, the particles of an organic solvent solution of the aforesaid antistatic agent have a diameter of 0.1 to 50μ, and hence are stably dispersed in the protective colloid solution.

An insulator, to which has been applied the thus prepared antistatic composition of the present invention, can successfully be protected from the charging phenomenon due to contact or friction thereof with, or peeling thereof from, various materials. At the same time, such antistatic effect as mentioned above is not deteriorated due to the state of the surroundings, and the insulator can effectively display its characteristics over a long period of time without being deteriorated in antistatic effect even when it is subjected to water-washing or the like.

The present invention is illustrated in further detail below with reference to examples.

EXAMPLE 1

A solution of 1 part of the antistatic agent $$C_{11}H_{23}CONCH_2COONa$$
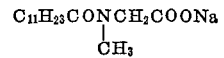

[exemplification (IV-1)] in 10 parts of dibutyl phthalate was stirred together with 10 parts of an anionic surface active agent (5% aqueous solution) and 30 parts of a 5% aqueous gelatin solution, and then dispersed by use of an ultrasonic disperser to form a dispersion. The particles in the dispersion were less than 1μ in size. This dispersion was gelled at a low temperature and then stored. The gelled dispersion was quite stable. Thereafter, the gelled antistatic agent dispersion was re-dissolved and added to a solution used for the protective layer of a double-faced, highly sensitive roentgeno-photographic material. The solution was then coated on said photographic material so that the proportion of the dispersion became 1 to 20 cc. per m.² of the photographic material, followed by drying to prepare a double-faced, highly sensitive roentgeno-photographic material. This material was moistened at 20 to 60% RH for several hours, frictioned with rubber or a nylon or Teflon cloth, developed, and then subjected to static mark formation test. The result was that no static mark formation was observed at all in the roentgeno-photographic material.

EXAMPLE 2

A solution of 0.8 part of the antistatic agent $[(CH_3)_3 \equiv N^{\oplus}-(CH_2)_{10}-N^{\oplus} \equiv (CH_3)_3] 2Br^{\ominus}$ [exemplification (II-1)] in 10 parts of tricresyl phosphate was stirred together with 9 parts of an anionic surface active agent (5% aqueous solution) and 40 parts of a 7% aqueous gelatin solution, and then dispersed by use of an ultrasonic disperser. The particles in the resulting dispersion were less than 1μ in size. This dispersion was gelled at a low temperature and then stored. Thereafter, the gelled dispersion was re-dissolved and added to a protective layer-forming solution for single-faced light-sensitive black-and-white photographic material, which solution was then coated on said light-sensitive material so that the proportion of the dispersion became 0.5 to 10 cc. per m.² of the light-sensitive material, followed by drying to prepare a singly light-sensitive black-and-white photographic material. This photographic material was tested in antistatic effect in the same manner as in Example 1 to obtain favorable results.

EXAMPLE 3

A solution of 1 part of the antistatic agent

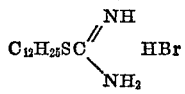

[exemplification (V–1)] in 10 parts of tricresyl phosphate was stirred together with 7 parts of a nonionic surface active agent (5% aqueous solution) and 30 parts of a 10% gelatin solution, and then dispersed by use of an ultrasonic disperser. The resulting dispersion was gelled at a low temperature and then stored. Thereafter, the gelled dispersion was re-dissolved and added to a protective layer-forming solution for double-faced, highly sensitive roentgeno-photographic material, which solution was then coated on said photographic material so that the proportion of the dispersion became 1 to 20 cc. per m.$^2$ of the photographic material, followed by drying to prepare a double-faced, highly sensitive roentgeno-photographic material. This photographic material was tested in antistatic effect in the same manner as in Example 1, whereby no static mark formation was observed at all and markedly excellent results were obtained.

EXAMPLE 4

A solution of 0.6 part of the antistatic agent

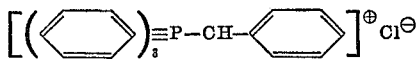

[exemplification (VIII–1)] in 10 parts of dibutyl phthalate was stirred together with 9 parts of an anionic surface active agent (5% aqueous solution) and 50 parts of an 8% aqueous gelatin solution, and then dispersed by use of an ultrasonic disperser. The resulting dispersion was gelled at a low temperature and then stored. The gelled dispersion was quite stable. Thereafter, the gelled dispersion was re-dissolved and added to a protective layer-forming solution for light-sensitive color negative photographic material, which solution was then coated on said light-sensitive material so that the proportion of the dispersion became 0.1 to 10 cc. per m.$^2$ of the light-sensitive material, followed by drying to prepare a light-sensitive color negative photographic material. This photographic material was tested in antistatic effect in the same manner as in Example 1 to obtain the same excellent results as in Example 1.

EXAMPLE 5

A solution of 0.7 part of the antistatic agent

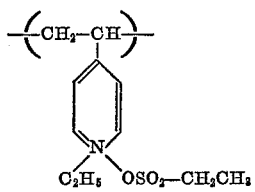

[exemplification (VII–1)] in 10 parts of triphenyl phosphate was stirred together with 10 parts of an anionic surface active agent (5% aqueous solution) and 35 parts of a 5% aqueous gelatin solution, and then dispersed by use of an ultrasonic disperser. The resulting dispersion was gelled at a low temperature and then stored stably. Thereafter, the gelled dispersion was re-dissolved and then coated as an upper-most surface layer of a light-sensitive photographic material, followed by drying to prepare a light-sensitive photographic material. In this case, the dispersion was coated so that the proportion thereof became 0.5 to 30 cc. per m.$^2$ of the light-sensitive material. The thus prepared light-sensitive photographic material was tested in antistatic effect in the same manner as in Example 1 to obtain the same excellent results as in Example 1.

EXAMPLE 6

A solution of 1 part of the antistatic agent

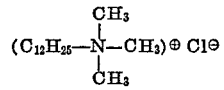

[exemplification (III–1)] in 10 parts of diethyl phthalate was stirred together with 10 parts of an anionic surface active agent (0.5% aqueous solution) and 50 parts of a 10% aqueous gelatin solution, and then dispersed by use of an ultrasonic disperser. The resulting dispersion was gelled at a low temperature and then stored stably. Thereafter, the gelled dispersion was re-dissolved and added to a protective layer-forming solution for a double-faced, highly sensitive roentgeno-photographic material, which solution was then coated on said photographic material so that the proportion of the dispersion became 1 to 20 cc. per m.$^2$ of the photographic material, followed by drying to prepare a double-faced, highly sensitive roentgeno-photographic material. This photographic material was tested in antistatic effect in the same manner as in Example 1 to obtain the same excellent results as in Example 1.

What is claimed is:

1. An antistatic composition which comprises a protective colloid solution and, dispersed therein, a solution of an antistatic agent in a substantially water-insoluble organic solvent of the phthalate, pyrrolidone or phosphate type and having a specific gravity lower than that of the protective colloid.

2. An antistatic composition as claimed in claim 1 wherein the substantially water-insoluble organic solvent is at least one member selected from the group consisting of dimethyl phthalate, diethyl phthalate, dibutyl phthalate, oleyl pyrrolidone, lauryl pyrrolidone, triphenyl phosphate, tricresyl phosphate and tributyl phosphate.

3. An antistatic composition as claimed in claim 1, wherein the protective colloid is at least one member selected from the group consisting of gelatin, casein, agar and polyvinyl alcohol.

4. An antistatic composition as claimed in claim 1, further comprising a solution of a surface active agent.

5. An antistatic composition as claimed in claim 3, wherein the protective colloid solution is an aqueous solution.

References Cited

UNITED STATES PATENTS

| | | | |
|---|---|---|---|
| 3,259,657 | 7/1966 | Stammler | 252—500 |
| 3,457,076 | 7/1969 | Yano et al. | 96—114.2 |
| 3,544,318 | 12/1970 | Boothe et al. | 117—201 X |
| 3,615,531 | 10/1971 | Meyer et al. | 96—114.2 |
| 3,619,284 | 11/1971 | Ray-Chaudhuri | 117—201 |

CHARLES E. VAN HORN, Primary Examiner

U.S. Cl. X.R.

96—87 A, 114.2; 117—201